May 26, 1970  C. J. DOMINICK  3,513,543
INSPECTION KNIFE
Filed Jan. 2, 1968
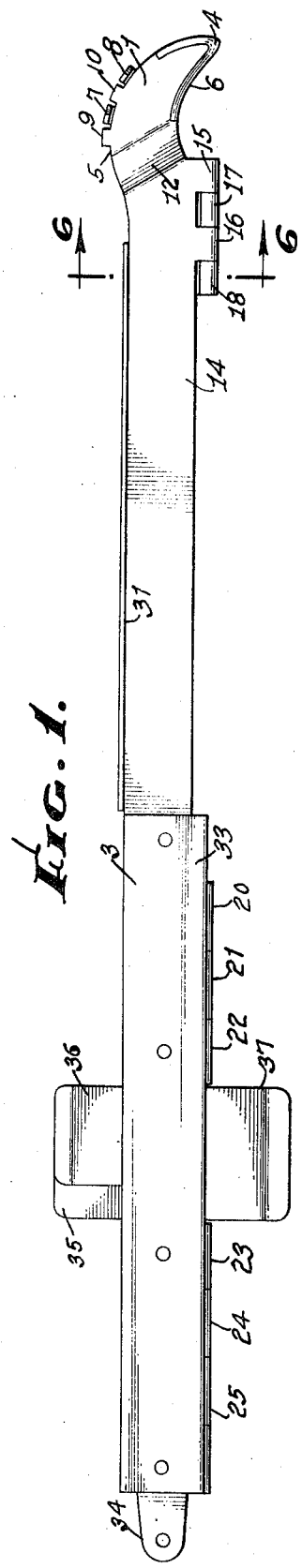
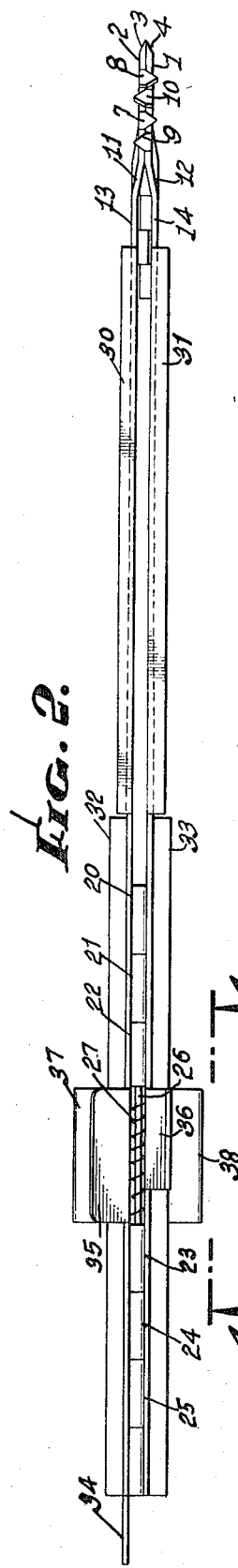
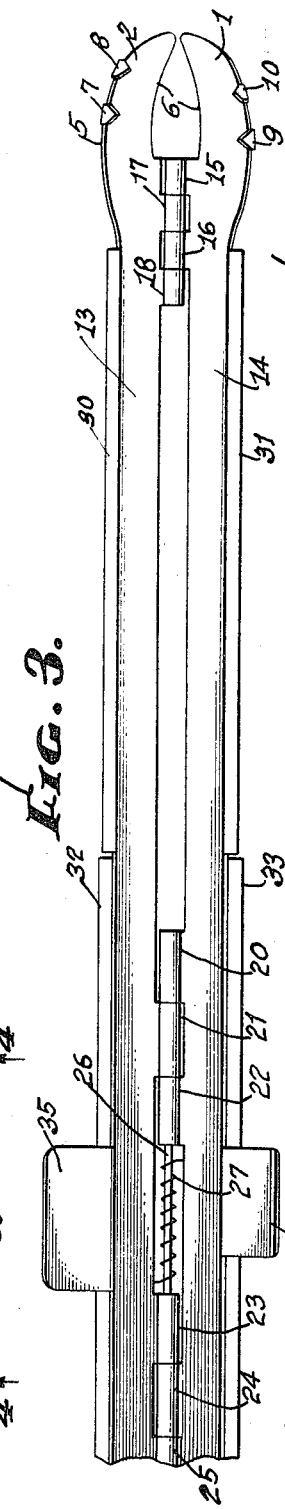
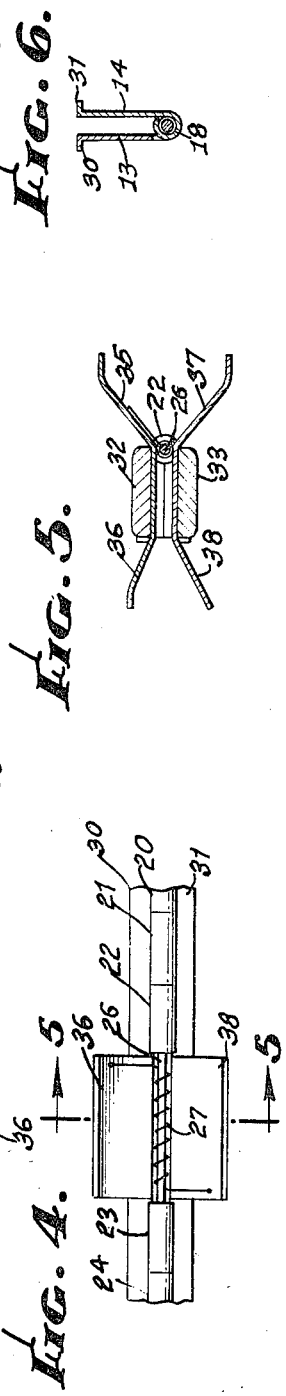
INVENTOR,
CHARLES J. DOMINICK,
By Calvin Brown
ATTORNEY.

United States Patent Office 3,513,543
Patented May 26, 1970

3,513,543
INSPECTION KNIFE
Charles J. Dominick, 3624 Durfee Ave.,
El Monte, Calif. 91732
Filed Jan. 2, 1968, Ser. No. 694,980
Int. Cl. B26b 11/00
U.S. Cl. 30—124                                       5 Claims

ABSTRACT OF THE DISCLOSURE

The device of the disclosure includes two blade members hinged together at the lower edges thereof whereby the blade members may be separated angularly or moved into parallel juxtaposition. The blade members at one end have sharpened or knife edges while the remaining portion of the blade members, or that portion of each thereof termed the shank, is not sharpened. The handle portion of the shank is provided with pairs of wings which extend outwardly from the edges of the shanks and the wings for each blade are in angular relationship to the plane of the shanks. A coil spring at the hinge portion between the shanks of the blade members normally urges the shanks and the blade members to close together and an operator may, while holding the handle in one hand, exert pressure against the wings to separate the blade members along the hinge line for the shanks. The specific shanks are plane surface so that the sharpened or knife edge of the blade members may close toegther and jointly form a thin cutting edge. The inspection knife is for the purpose of cutting into meat and then separating the meat at the cut or slit area to allow visible inspection of the body of the meat to determine how rare it may be, and if further cooking is necessary dependent upon the desire of the person eating the meat. As it is sometimes desired to lift the meat from the broiler or bar-B-que grille or frying pan, the upper edges of each blade member are provided with two or more barbs, the barbs of one blade overlapping the other blade in staggered relationship whereby the barbs may be separated for penetration of the meat, or released from the meat.

---

An object of the present invention is to provide an inspection knife which allows the interior of a body of meat to be visibly viewed to determine the rareness thereof or whether the meat is raw, medium cooked, or well done, and the object is attained by providing a simple structure which is easily handled with parts not likely to get out of order, which is attractive in appearance and generally superior to known devices and methods for separating the body of the meat at a slit portion in order to observe visually the interior of the meat during a cooking operation.

A further object is the provision of an inspection knife which may be manipulated by one hand, and wherein the meat is easily cut or slit at a given point in the body thereof and the meat at said portion separated utilizing the fingers of one hand for manipulating the inspection device.

A further object is the provision of an inspection knife which may be manipulated by a single hand of the operator and whereby the meat being inspected may be picked up by the device, turned over or moved to another location, easily and simply.

A further object is the provision of an inspection knife of simple construction, foolproof in operation, and generally superior to means and methods now used for visually inspecting meat to determine the cooking thereof, and a device which will visibly permit this inspection within a minimum of time and not require other instrumentalities for said inspection.

With the above and other objects in view, the invention consists in the novel and useful provision, formation, construction, association, and relative arrangement of parts, members and features, all as shown in one embodiment in the accompanying drawing, described generally and more particularly pointed out in the claims.

In the drawing:

FIG. 1 is a side elevation of one side of the inspection knife, as an entirety;

FIG. 2 is a top plan view of the knife of FIG. 1;

FIG. 3 is a fragmentary, top plan view, the inspection knife being angularly opened throughout its length;

FIG. 4 is a fragmentary view, taken on the line 4—4 of FIG. 2;

FIG. 5 is a cross sectional view on the line 5—5 of FIG. 4; and,

FIG. 6 is a cross sectional view on the line 6—6 of FIG. 1.

Referring to the drawing, the inspection knife includes a pair of blades 1 and 2 both of which are beveled from the outer plane surface thereof along the edge toward the inner plane surface to provide a sharp cutting edge formed by the two beveled portions as shown in FIG. 2 at 3 and 4. The cutting edge follows the contour of the lower portion or edge of each blade and in this respect the top edge of each blade is curved convexedly as shown for blade 1, blade 2 being similarly formed at 5 while the bottom edge of each blade is concavedly curved as shown at 6, terminating between the two curvatures 5 and 6 in a pointed nose for each blade. The top edge of each blade is provided with prongs or spurs 7 and 8 for blade 2 and 9 and 10 for blade 1 which are in right angular relationship to the plane of each blade. The prongs or spurs of one blade are offset with respect to the prongs or spurs of the opposite blade whereby when the blades are closed or in juxtaposition, the spurs or prongs overlap the top edges of the blades and interleaf as shown in FIG. 2. The prongs or spurs have triangular ends, the points of which are adapted to penetrate meat or other objects and impale the meat between the separated blades so that the meat is gripped in the manner of a jaw to the end that when the inspection device is manipulated, the meat may be moved, turned over or be adjusted on the grille, as desired. Each blade shank or arm 13 and 14 has an offset portion 11 and 12 whereby the shanks or arms are in substantial parallelism. The shanks or arms, as stated, are parallel and spaced apart along their inner face portions, extending the full length of the inspection knife. The bottom or lower edge of each shank or arm is provided with knuckles 15 and 16 for the shank or arm 14, and 17 and 18 for the shank or arm 13. The usual hinge pin is passed through the knuckles. The shanks or arms at the rear ends thereof and along the bottom edges are provided with a hinge having the usual knuckles through which a pin is passed, as shown in the FIGS. 20, 21, 22, 23, 24 and 25. The number of knuckles is not important save and except to stabilize the knife and the shanks or arms therefor. Interposed between the knuckles 22 and 23 and surrounding the hinge pin 26, see FIG. 3, is a coil spring 27, which coil spring normally urges the shanks or arms to close together so that the inner plane surfaces thereof are in juxtaposition, as shown in FIG. 2.

The shanks or arms 13 and 14 inward from the blades 1 and 2 are provided with narrow width flanges 30 and 31 respectively outwardly extending at right angles to the planes of said shanks or arms. This structure adds stability to the shanks or arms. The flanges extend substantially one-half the length of the shank or arms and at the ends of the flanges, are thin blocks of plastic or wood 32 and 33 joined to the shank or arms and which extend to the end of said arms or shanks to provide handle portions for the inspection knife. Shank or arm 13 is extended at the end to provide a perforated lug 34 whereby the device as an entirety may be held on a pin or hook when the device is not in use.

Substantially at the zone of pin 26 each shank or arm is extended in width to provide wings in broken line relationship on opposite edges thereof as shown at 35, 36, 37 and 38. The wings in each instance are inclined outwardly relative to the plane of each shank or arm. The wings 35 and 37 terminate in flat portions which are substantially parallel while intermediate portions thereof join the shanks or arms in convergent relationship. The same is true for the wings 36 and 38 although the convergency between the wings 36 and 38 is not as great as for the wings 35 and 37.

The operation, uses and advantages of the invention are as follows.

When the device is to be used to inspect the degree of cooking of a body of meat, the operator will slit the body by means of the blade edges and after the slit is made to the desired depth, the operator by use of the fingers of one hand causes approach of the wings 35 and 37, or separation of wings 36 and 38 to separate the blades along the hinges at an angle, as shown in FIG. 3. After inspection has been made as to rareness of the meat, the wings may be released while still holding the handle and the shanks and the blades will close to the position of FIG. 2, being actuated to a closed position by the spring 27. The wood or plastic members 32 and 33 which form the handle, reinforce and stabilize the rear end of the knife while the flange portions 30 and 31 stabilize the shanks or arms forward of the handle to the blades 1 and 2. The knife is therefore quite stable. The downwardly directed and curved edges of the blades meeting in a pointed nose allow readily cutting into the body of meat to form a slit and while the blades are still within the body, to separate the blades to allow visual inspection of the interior of the body of the meat without allowing the shank or arms to close. The blades are readily removed from the body of the meat at the slit without any damage to the meat body. This operation requires a few moments of time and is easy to accomplish without effort on the part of the person inspecting the meat. The device may be turned so that the prongs or spurs 7 to 10 inclusive may, as a jaw, impale the meat and thus allow lifting of the meat or a turning thereof.

Pressure to cause the wings 35 and 37 to open the blades is easily attained by the fingers while at the same time grasping the handle in the palm of the hand, or pressure may be exerted outwardly between the wings 36 and 38 to separate the same and, likewise, to cause separation between the blades and the blade shanks or arms. If assistance is needed in closing the shank or arms and the blades, pressure may be exerted to cause approach of the wings 36 and 38 if the spring is not sufficient to accomplish this function. The device is simple, easy to use, allows ready manipulation of meat to determine the degree of cooking, is attractive in appearance, and superior to the two-handed use of a fork and a knife to perform the function obtained so easily with the present device in the inspection during the cooking of meat.

I claim:

1. In a visual inspection knife for meats, a pair of straight parallel shanks of substantially equal dimensions hinged together longitudinally at the bottom edges thereof; a pair of blades each integral with one of the shanks and located at one thereof; the blades having flat inner surfaces which are normally in contact, and also having sharpened edges which in effect form a single cutting edge, when the blades are in contact; and spring means acting on said shanks to normally hold the blades in contact; means being provided to permit manual swinging of the shanks on said hinge to effect separation of said blades.

2. The device as set forth in claim 1, characterized in: that each shank is provided with an outwardly extending integral wing whereby the shanks may be moved on the hinge means to cause separation of the shanks and the blades.

3. The invention defined in claim 2, wherein each shank is provided with a pair of outwardly extending integral wings, one at the top edge, the other at the bottom edge of each wing; the two wings which extend from the bottom of the knife having a greater convergence than the two wings which extend from the top of the knife; and handle means fixed to said shanks and extending on both sides of the pairs of wings.

4. The device as set forth in claim 1, characterized in: that the lower edge of each blade is sharpened and the upper edge of each blade is provided with barbs extending transversely of the blade and adapted to overlap the top edge of the opposite blade when the blades are closed together.

5. The invention defined in claim 4, wherein the lower sharpened edge of each blade is concave, and the upper edge of each blade, adjacent said concave sharpened edge, is convex; the convex and concave edges meeting in a sharpened nose.

References Cited
UNITED STATES PATENTS

| | | | |
|---|---|---|---|
| 158,054 | 12/1874 | Fawcett | 30—146 X |
| 974,077 | 10/1910 | Kleeberger | 7—14.3 X |
| 1,326,373 | 12/1919 | Rice | 30—24 |
| 2,130,949 | 9/1938 | Collens | 30—24 |
| 2,770,035 | 11/1956 | O'Brien | 30—114 |
| 2,797,478 | 7/1957 | Gebhart | 30—24 |

ROBERT C. RIORDON, Primary Examiner

J. C. PETERS, Assistant Examiner

U.S. Cl. X.R.

7—14.3